July 4, 1933.  J. B. WHITTED  1,916,544
WINDSHIELD WIPER ARM CONSTRUCTION
Filed May 9, 1932
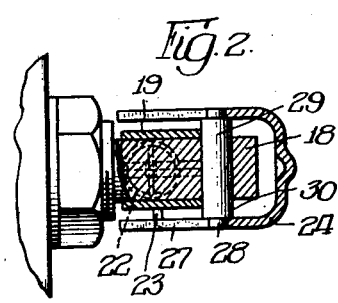
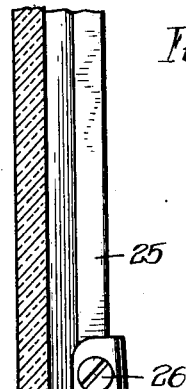
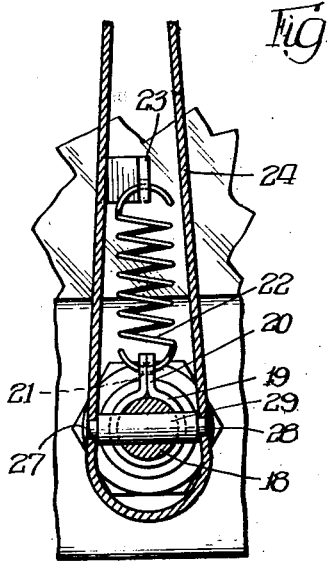
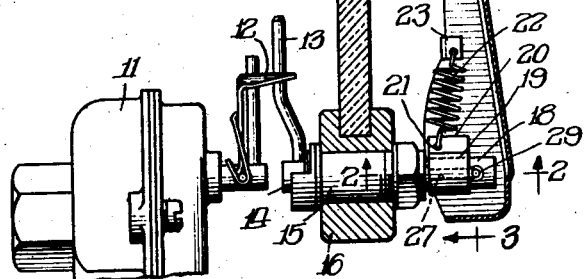
Inventor:
John B. Whitted, Patented July 4, 1933

1,916,544

UNITED STATES PATENT OFFICE

JOHN B. WHITTED, OF CHICAGO, ILLINOIS, ASSIGNOR TO STEWART-WARNER CORPORATION, OF CHICAGO, ILLINOIS, A CORPORATION OF VIRGINIA

WINDSHIELD WIPER ARM CONSTRUCTION

Application filed May 9, 1932. Serial No. 610,023.

This invention relates to a new and improved windshield wiper arm construction, and more particularly to a construction whereby the wiper arm may be efficiently connected to the wiper shaft.

Windshield wipers comprise in general a driving shaft extending at right angles to the plane of the glass of the windshield, a wiper arm connected to the shaft and extending approximately parallel to the glass, and a wiper blade assembly carried by the arm. It is highly desirable to provide resilient or yielding means urging the blade against the glass so as to secure the proper engagement of the blade for efficient wiping without putting an undue load on the driving mechanism.

It is an object of the present invention to provide a new and improved windshield wiper construction.

It is also an object to provide an improved connection between a wiper arm and driving shaft.

It is an additional object to provide a construction in which means are provided for urging the free end of the wiper arm toward the windshield glass.

It is a further object to provide a construction in which the means urging the wiper arm toward the glass also serves to assist in maintaining the parts in assembled relation.

It is also an object to provide a construction composed of but few and simple parts adapted for easy assembly.

Other and further objects will appear as the description proceeds.

I have shown certain preferred embodiments of my invention in the accompanying drawing, in which—

Figure 1 is an elevation of a windshield wiper partly in section, showing my invention;

Figure 2 is a section, on an enlarged scale, taken on line 2—2 of Figure 1; and

Figure 3 is a section, on an enlarged scale, taken on line 3—3 of Figure 1.

In the drawing, the driving motor or mechanism is shown at 11, operating a clutch member 12 which engages an arm 13 carried by the wiper shaft 14. This shaft 14 is carried in a bearing 15 fitted in a rim 16 secured to the windshield glass 17. It will be understood that this windshield is connected at its upper end so that it may swing to the right as seen in Figure 1. The swinging connection and windshield details form no part of the present invention and have not been shown.

The outer end 18 of the shaft 14 has fitted thereon the collar 19. This collar, as best shown in Figure 3, consists of a flat strip of metal bent to circular shape to form the collar and with parallel extending end portions 20 having the opening 21 therein to receive one end of the coil spring 22. The other end of the spring 22 is hooked through a perforation in the inwardly extending lug 23, which lug is connected to the wiper arm 24. The wiper arm 24 actuates any usual type of wiper blade construction 25 by means of the pivotal connection 26.

The wiper arm 24 is a stamped metal member which serves to house the end 18 of the shaft and the collar 19 and spring 22. This member 24 adjacent its end is provided with the parallel slots 27 which are of a size to permit movement over the reduced ends 28 of the pivot pin 29, as best shown in Figure 2. The central portion of the pin 29 is larger and forms shoulders 30 which engage the walls of the arm 24 adjacent the slots 27 and prevent lateral movement of that member. The spring 22 holds the collar 19 against the pin 29 and also serves to urge the upper end of the arm 24 inwardly toward the glass, as seen in Figure 1.

The method of assembly of the parts will be readily apparent. After the bearing 15 has been secured in the frame 16, the shaft 14 is slipped in from the left side in Figure 1, its end 18 extending to the position shown. The collar 19 is next slipped over the end of the shaft and the pin 29 put in place, serving to retain the collar. The spring 22 is connected to the lug 23 of the arm 24 and then the arm 24 and spring 22 together are so placed that the lower end of the spring 22 may be hooked into the opening 21 in the extended portion 20 of the collar 19. The arm 24 is then moved to bring the slots 27 in registration with the reduced ends 28 of the pin 29 and the lower end of the arm is moved laterally to the assembled position shown in Figure 1. The spring 22 serves to hold the assembly in place in addition to serving to urge the wiper blade against the glass.

My wiper arm assembly is composed of but four parts, the pin 29, the collar 19, spring 22 and arm 24. All of these parts are simple in design and adapted for machine manufacture at small cost. The assembly is simple and quick and can be accomplished at small labor cost.

The coil spring 22 accomplishes its double function efficiently and urges the wiper blade against the glass with the proper tension. The arm 24 due to its generally U-shaped design in cross section is substantially rigid under all normal operating conditions. The rounded upper portion fully houses and protects the connecting elements and shaft end and also adds to the pleasing appearance of the assembly.

While I have shown one preferred embodiment of my invention in detail, this is to be understood to be illustrative only, as my construction may be modified to meet differing conditions and requirements and I contemplate such modifications and changes as come within the spirit and scope of the appended claims.

I claim:

1. In a windshield wiper construction, a driving shaft, a cross pin carried by the shaft adjacent its end, a wiper arm having a U-shaped portion receiving the shaft end and pivoted on said cross pin, and a tension spring connected to the shaft and wiper arm.

2. In a windshield wiper construction, a driving shaft, a cross pin carried by the shaft, shoulders adjacent the ends of the pin, reduced ends beyond the shoulders, a wiper arm having spaced portions formed to fit about the reduced ends of said pin adjacent the shoulders.

3. In a windshield wiper construction, a driving shaft, a cross pin carried by the shaft, shoulders adjacent the ends of the pin, reduced ends beyond the shoulders and a wiper arm having spaced portions with notches formed therein fitting about the reduced ends of said pin adjacent the shoulders.

4. In a windshield wiper construction, a driving shaft having a transverse opening formed therein, a cross pin having its central portion fitted therein and reduced ends extending on opposite sides of the shaft, a wiper arm having a U-shaped portion enclosing the shaft end and pivotally engaging the reduced ends of the cross pin adjacent the shaft, and a tension spring connecting the arm and shaft and urging the arm toward a position adjacent and parallel to the shaft.

5. In a windshield wiper construction, a driving shaft having a transverse opening formed therein, a cross pin having its central portion fitted therein and reduced ends extending on opposite sides of the shaft, a wiper arm having a U-shaped portion enclosing the shaft end and having the sides thereof formed with notches therein fitting over the reduced ends of the cross pin adjacent the shaft, the notches being narrower than the intermediate portion of the pin whereby the arm retains the pin in position in the shaft, and means maintaining the notches in engagement with the pin.

6. In a windshield wiper construction, a driving shaft having a transverse opening formed therein, a cross pin having its central portion fitted therein and reduced ends extending on opposite sides of the shaft, a wiper arm having a U-shaped portion enclosing the shaft end and having the sides thereof formed with notches therein fitting over the reduced ends of the cross pin adjacent the shaft, the notches being narrower than the intermediate portion of the pin whereby the arm retains the pin in position in the shaft, and a coil spring having one end connected to the wiper arm and the other end connected to the shaft for maintaining the notches in engagement with the pin.

Signed at Chicago, Illinois, this 2nd day of May, 1932.

JOHN B. WHITTED.